(12) United States Patent
Kawamoto et al.

(10) Patent No.: US 7,757,577 B2
(45) Date of Patent: Jul. 20, 2010

(54) POSITION DETECTING DEVICE FOR TRANSMISSION GEAR CONNECTING MECHANISM AND TRANSMISSION HAVING POSITION DETECTING DEVICE

(75) Inventors: Yoshinobu Kawamoto, Atsugi (JP); Makoto Futamura, Ayase (JP); Masasumi Kitou, Nagoya (JP)

(73) Assignee: Nissan Motor Co., Ltd., Yokohama (JP)

( * ) Notice: Subject to any disclaimer, the term of this patent is extended or adjusted under 35 U.S.C. 154(b) by 550 days.

(21) Appl. No.: 11/751,173

(22) Filed: May 21, 2007

(65) Prior Publication Data

US 2007/0272046 A1  Nov. 29, 2007

(30) Foreign Application Priority Data

May 24, 2006  (JP)  ............................. 2006-143599

(51) Int. Cl.
   *F16H 59/00* (2006.01)
(52) U.S. Cl. ........................................ 74/335; 477/906
(58) Field of Classification Search .................. 477/906
   See application file for complete search history.

(56) References Cited

U.S. PATENT DOCUMENTS

| 4,766,774 A * | 8/1988 | Tamai ...................... 74/473.12 |
| 4,911,031 A * | 3/1990 | Yoshimura et al. ............ 74/335 |
| 5,832,777 A * | 11/1998 | Weilant ........................ 74/335 |
| 6,182,518 B1 * | 2/2001 | Baur .......................... 73/865.9 |
| 6,591,704 B2 * | 7/2003 | Kamiya et al. ................. 74/335 |
| 7,127,961 B2 * | 10/2006 | Braford et al. ................. 74/340 |
| 2005/0193847 A1 * | 9/2005 | Heinrich ...................... 74/335 |
| 2005/0252326 A1 | 11/2005 | Mueller |

FOREIGN PATENT DOCUMENTS

| DE | 19731842 | 1/1998 |
| DE | 10312401 | 2/2003 |
| EP | 0217540 | 4/1987 |
| EP | 0310387 | 4/1989 |
| EP | 1411279 | 4/2004 |
| EP | 1596104 | 11/2005 |
| GB | 2315526 | 2/1998 |
| JP | 2004-052925 | 2/2004 |

\* cited by examiner

*Primary Examiner*—David D Le
*Assistant Examiner*—Justin Holmes
(74) *Attorney, Agent, or Firm*—Global IP Counselors, LLP

(57) ABSTRACT

A position detecting device is basically provided with a control section, a detecting section and a setting section. The control section repeatedly controls a gear connecting mechanism in a vehicle transmission to selectively perform a gear connecting operation to obtain a selected gear range and a gear releasing operation to release the selected gear range after the gear connecting operation has been performed. The detecting section detects a position of a connecting member of the gear connecting mechanism after the gear connecting operation has been performed. The setting section sets a shift completion position at which connecting of the selected gear range is determined to be completed based on a plurality of positions of the connecting member of the gear connecting mechanism detected by the detecting section.

11 Claims, 7 Drawing Sheets

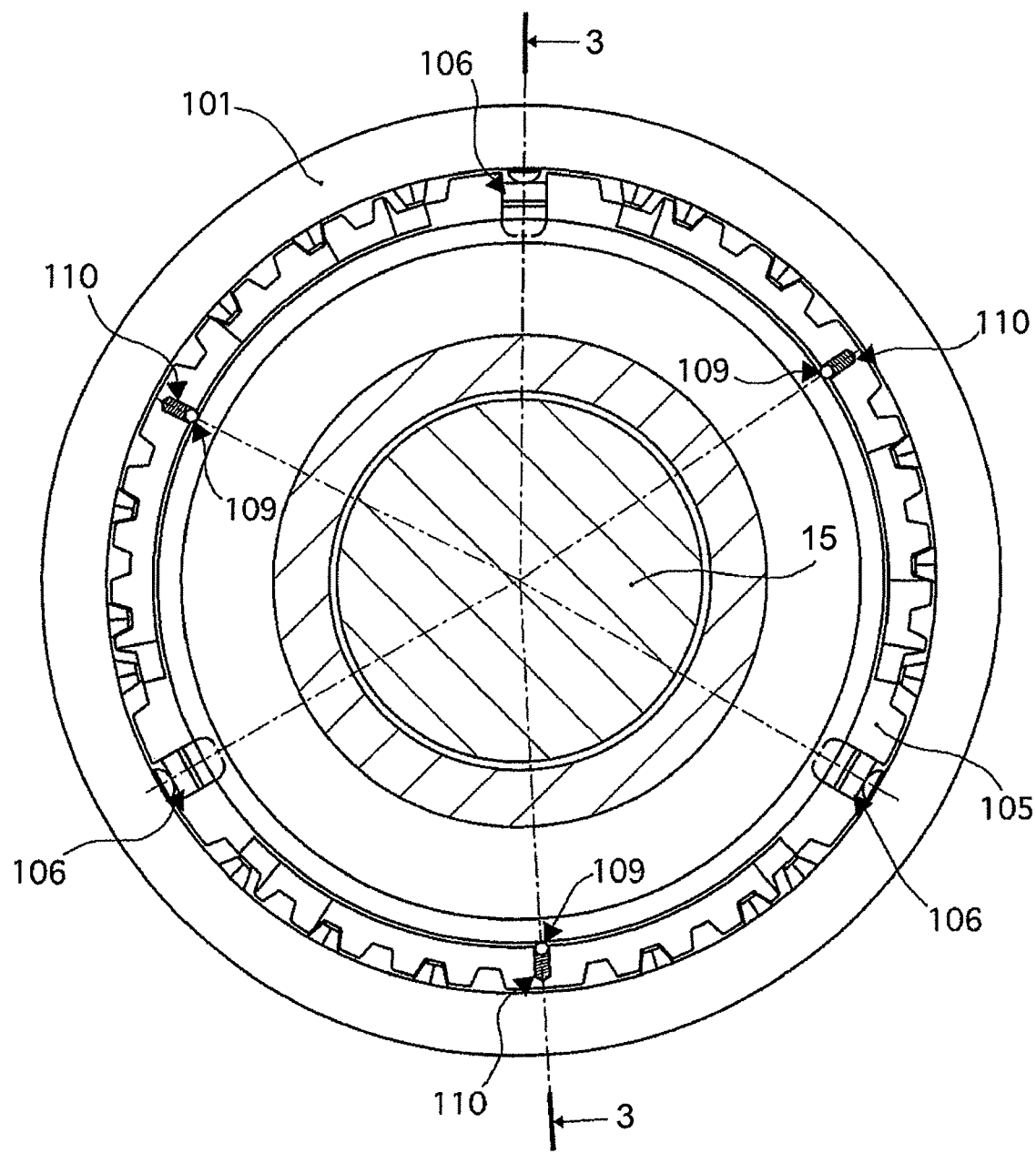
F I G. 2

POSITION DETECTING DEVICE FOR TRANSMISSION GEAR CONNECTING MECHANISM AND TRANSMISSION HAVING POSITION DETECTING DEVICE

CROSS-REFERENCE TO RELATED APPLICATIONS

This application claims priority to Japanese Patent Application No. 2006-143599, filed on May 24, 2006. The entire disclosure of Japanese Patent Application No. 2006-143599 is hereby incorporated herein by reference.

BACKGROUND OF THE INVENTION

1. Field of the Invention

The present invention relates to a position detecting device for a vehicle transmission gear connecting mechanism and a vehicle transmission provided with the position detecting device.

2. Background Information

Japanese Laid-Open Patent Application Publication No. 2004-52925 discloses a conventional transmission control apparatus configured and arranged to set a shift-select completion position of a synchromesh transmission mechanism in advance in order to prevent erroneously determining that the gear connecting operation has completed. In the conventional control apparatus disclosed in this reference, the position of a gear connecting mechanism of the transmission during the gear connecting operation is detected, and the position of the gear connecting mechanism is set as the shift-select completion position, at which the gear connecting operation is determined to be completed, when a change rate in the position of the gear connecting mechanism is less than or equal to a prescribed threshold value and when the time that has elapsed from the start of the gear connecting operation is equal to or greater than a prescribed value.

In view of the above, it will be apparent to those skilled in the art from this disclosure that there exists a need for an improved position detecting device for a transmission gear connecting mechanism. This invention addresses this need in the art as well as other needs, which will become apparent to those skilled in the art from this disclosure.

SUMMARY OF THE INVENTION

In the conventional transmission, the gear connecting mechanism is arranged as, for example, a synchromesh mechanism having a coupling sleeve, which is moved along a rotational shaft to connect a gear (gear range). However, a protruding part of the coupling sleeve may interfere with protruding parts of peripheral members while the gear is being connected depending on relative locations of the coupling sleeve and the peripheral members. In such case, the movement of the coupling sleeve along the rotational shaft may be hampered, and the connection of the gear may not be completed.

In the conventional transmission control apparatus disclosed in the above mentioned reference, the shift-select completion position at which the gear connecting operation is assumed to be completed is set solely based on the change rate in the position of the gear connecting mechanism and the time that has elapsed from the initiation of the gear connecting operation. Therefore, even when a connecting member of the gear connecting mechanism such as the coupling sleeve may be unable to move due to interference with the peripheral members, the shift-select completion position, at which the gear connecting operation is assumed to be completed, may be erroneously set despite the fact that the connection of the gear has not been completed.

The present invention was devised in view of the aforementioned problems, and one object of the present invention is to provide a position detecting device for a transmission gear connecting mechanism that can prevent erroneously determining a gear connecting operation completion position of the transmission gear connecting mechanism.

In order to achieve the aforementioned object, a position detecting device is provided that basically comprises a control section, a detecting section and a setting section. The control section is configured to repeatedly control a gear connecting mechanism in a vehicle transmission to selectively perform a gear connecting operation to obtain a selected gear range and a gear releasing operation to release the selected gear range after the gear connecting operation has been performed. The detecting section is configured and arranged to detect a position of a connecting member of the gear connecting mechanism after the gear connecting operation has been performed. The setting section is configured to set a shift completion position at which connecting of the selected gear range is determined to be completed based on a plurality of positions of the connecting member of the gear connecting mechanism detected by the detecting section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a side elevational view of a 1-R synchromesh mechanism of the transmission as viewed in an axial direction in accordance with the illustrated embodiment of the present invention;

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
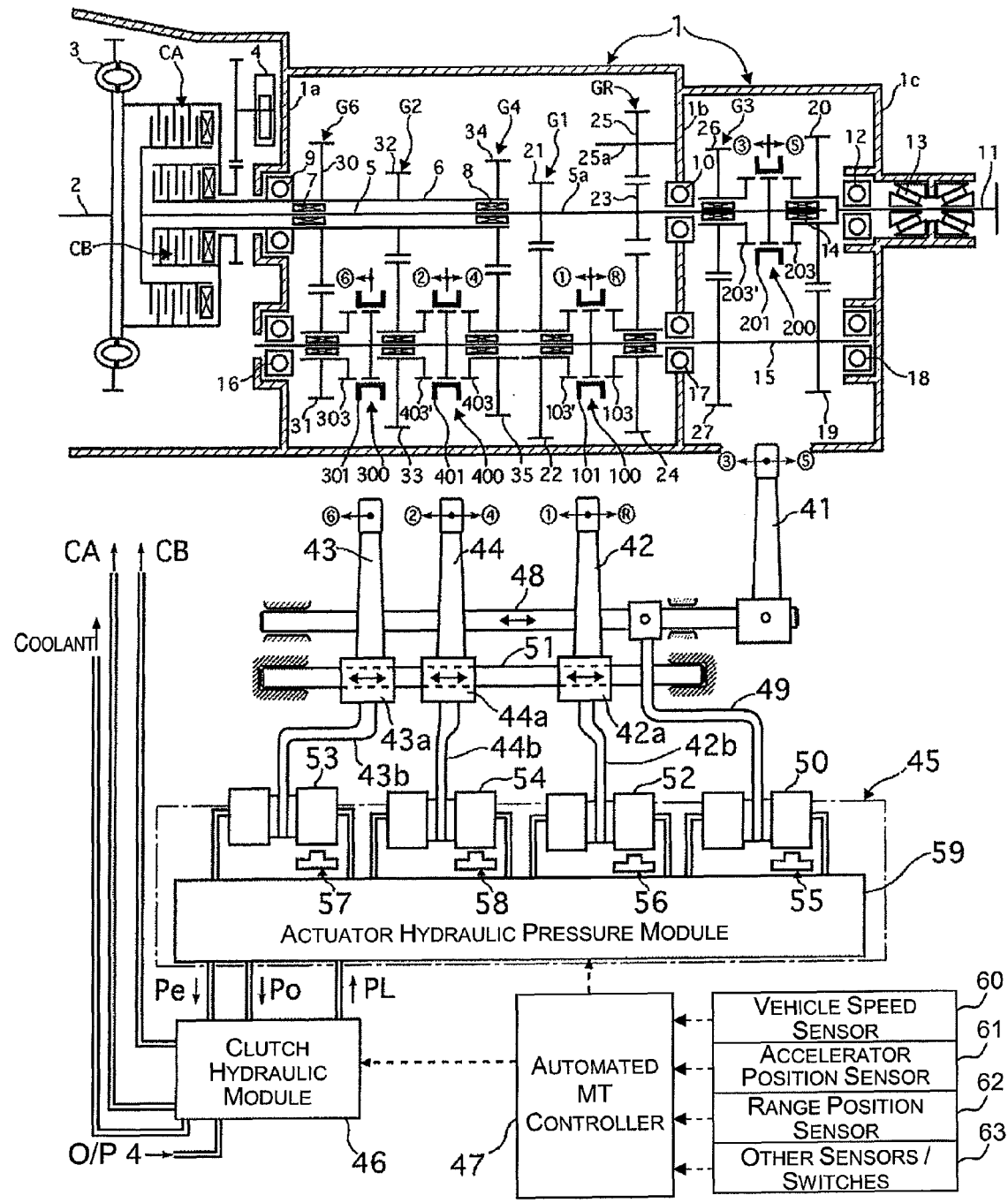
FIG. 1 is an overall schematic diagram of a twin-clutch automated manual transmission to which a position detecting device in accordance with a preferred embodiment of the present invention.

Referring initially to FIG. 1, a twin-clutch (dual-clutch) automated manual transmission provided with a position detecting device for a gear connecting mechanism is illustrated in accordance with a preferred embodiment of the present invention.

Overall Structure of Twin-Clutch Automated Manual Transmission

FIG. 1 is a schematic diagram showing an overall structure of the twin-clutch automated manual transmission provided with the position detecting device of the embodiment of the present invention. The constituent features of the input section and input and output shafts of the twin-clutch automated manual transmission will now be explained.

Generally, a manual transmission is efficient and structurally simple. However, the manual transmission requires a driver to perform all operations for changing gears. An automated manual transmission is a transmission that retains the structure of a manual transmission while incorporating a mechanism to automate the gear changing operations.

With a conventional automated manual transmission, a clutch is disengaged temporarily in order to execute a change of gears and the resulting interruption of torque occurring during gear changing feels odd to a driver. The twin-clutch automated manual transmission was developed in order to alleviate this odd feeling and is provided with a second clutch in addition to the clutch provided on a conventional automated manual transmission. The twin-clutch automated manual transmission suppresses the torque interruption by reversing (switching) the connection states of the two clutches (i.e., connecting one clutch and disconnecting the other).

As shown in FIG. 1, the twin-clutch automated manual transmission includes a transmission case 1, a drive input shaft 2, a torsional damper 3, an oil pump 4, a first transmission input shaft 5, a second transmission input shaft 6, a transmission output shaft 11, a counter shaft 15 (example of the rotational shaft), an actuator unit 45 and a clutch hydraulic pressure module 46. The transmission further includes a first clutch CA and a second clutch CB arranged in an input section of the transmission. The first clutch CA is connected or engaged when one of a plurality of gear ranges (e.g., first speed, third speed, fifth speed and reverse) included in an odd number gear group (first gear group) is selected and the second clutch CB is connected when one of a plurality of gear ranges (e.g., second speed, fourth speed, and sixth speed) included in an even number gear group (second gear group) is selected. The drive sides of both of the first and second clutches CA and CB are connected to the drive input shaft 2 through the torsional damper 3 as shown in FIG. 1. The drive input shaft 2 is configured and arranged to receive a rotary drive force (torque) from an engine or other drive source that is connected to an input side of the drive input shaft 2.

When one of the odd numbered gear ranges is selected, the first clutch CA is engaged such that the driven side thereof transfers the rotary drive torque of the engine or other drive source to the first transmission input shaft 5. On the other hand, when one of the even numbered gear ranges is selected, the second clutch CB is engaged such that the driven side thereof transfers the rotary drive torque of the engine or other drive source to the second transmission input shaft 6. The first and second clutches CA and CB are operatively coupled to the clutch hydraulic pressure module 46 that will be explained in more detail below with reference to FIG. 1.

The oil pump 4 is driven by the drive source at all times and the oil discharged from the oil pump 4 serves as a hydraulic pressure source for controlling connection and release of the clutches CA and CB and for controlling selection of the gear ranges by operating the actuator unit 45. The excess oil from the oil pump 4 is delivered as lubricating oil to parts where lubrication is required.

As shown in FIG. 1, the second transmission input shaft 6 is arranged as a hollow shaft and the first transmission input shaft 5 is arranged as a solid shaft. The second transmission input shaft 6 is coaxially supported on the first transmission input shaft 5 with a front needle bearing 7 and a rear needle bearing 8 such that the second transmission input shaft 6 can rotate freely with respect to the first transmission input shaft 5.

Moreover, the second transmission input shaft 6 is supported on a ball bearing 9 such that the second transmission input shaft 6 can rotate freely with respect to a frontward end wall 1a of the transmission case 1 as shown in FIG. 1. The first transmission input shaft 5 includes a rearward end portion 5a that protrudes from the rearward end of the second transmission input shaft 6. The protruding rearward end portion 5a of the first transmission input shaft 5 passes through an intermediate wall 1b of the transmission case 1 and is supported on a ball bearing 10 such that the first transmission input shaft 5 can rotate freely with respect to the intermediate wall 1b.

The transmission output shaft 11 is arranged coaxially at the rearward end portion 5a of the first transmission input shaft 5. The transmission output shaft 11 is rotatably supported on a rear end wall 1c of the transmission case 1 with a tapered roller bearing 12 and an axial bearing 13 as shown in FIG. 1. The transmission output shaft 11 rotatably supports the rearward end portion 5a of the first transmission input shaft 5 through a needle bearing 14.

The counter shaft 15 is arranged parallel to the first transmission input shaft 5, the second transmission input shaft 6, and the transmission output shaft 11. The counter shaft 15 is rotatably supported on the frontward end wall 1a, the intermediate wall 1b, and the rear end wall 1c of the transmission case 1 with a plurality of roller bearings 16, 17, and 18, respectively.

As shown in FIG. 1, a gear changing mechanism of the twin-clutch automated manual transmission is arranged as a constant-mesh transmission having a synchromesh mechanism. The twin-clutch automated manual transmission has a plurality of gear sets (gear pairs) having different tooth count ratios to achieve a plurality of gear ranges (i.e., six forward gear ranges (speeds) and one reverse gear range in the example shown in FIG. 1).

More specifically, as shown in FIG. 1, the counter shaft 15 has a counter gear 19 provided integrally on the rearward end of the counter shaft 15. The transmission output shaft 11 includes an output gear 20 (toothed wheel). The counter gear 19 and the output gear 20 are meshed together such that the rotation of the counter shaft 15 is transmitted to the transmission output shaft 11. The counter gear 19 and the output gear 20 also constitute a gear set.

Moreover, a plurality of gear sets G1, G3 and GR of the odd numbered gear ranges (first speed, third speed, and reverse, respectively) is arranged between the rearward end portion 5*a* of the first transmission input shaft 5 and the counter shaft 15 such that the first speed gear set G1 is located the closest toward the front (the input side) of the transmission, the reverse gear set GR is located farther toward the rear (the output side), and the third speed gear set G3 is located still farther toward the rear.

The first speed gear set G1 includes a first speed input gear 21 provided on the rearward end portion 5*a* of the first transmission input shaft 5 and a first speed output gear 22 (toothed wheel) provided on the counter shaft 15. The first speed input gear 21 and the first speed output gear 22 are arranged so as to be intermeshed with each other.

The reverse gear set GR includes a reverse input gear 23 provided on the rearward end portion 5*a* of the first transmission input shaft 5, a reverse output gear 24 (toothed wheel) provided on the counter shaft 15, and a reverse idler gear 25 that meshes with both of the reverse input gear 23 and the reverse output gear 24. The reverse idler gear 25 is rotatably supported on a reverse idler shaft 25*a*. As shown in FIG. 1, the reverse idler shaft 25*a* is arranged to protrude from the intermediate wall 1*b* of the transmission case 1.

The third speed gear set G3 includes a third speed input gear 26 (toothed wheel) provided on rearward end portion 5*a* of the first transmission input shaft 5 and a third speed output gear 27 provided on the counter shaft 15. The third speed input gear 26 and the third speed output gear 27 are arranged so as to be intermeshed with each other.

A 1-R synchromesh mechanism 100 (gear connecting mechanism) is provided on the counter shaft 15 between the first speed gear set G1 and the reverse gear set GR. The 1-R synchromesh mechanism 100 includes a coupling sleeve 101 (connecting member) and a pair of clutch gears 103' and 103. The clutch gear 103' is coupled to the first speed output gear 22 and the clutch gear 103 is coupled to the reverse output gear 24. When the coupling sleeve 101 of the 1-R synchromesh mechanism 100 is moved leftward (toward the input side) from the neutral position shown in FIG. 1 until a spline engagement is achieved with respect to the clutch gear 103', the rotation of the first speed output gear 22 can be transferred to the counter shaft 15 and the first speed can be selected. When the coupling sleeve 101 of the 1-R synchromesh mechanism 100 is moved rightward (toward the output side) from the neutral position shown in FIG. 1 until a spline engagement is achieved with respect to the clutch gear 103, the rotation of the reverse output gear 24 can be transferred to the counter shaft 15 and reverse can be selected.

A 3-5 synchromesh mechanism 200 (gear connecting mechanism) is provided on the rearward end portion 5*a* of the first transmission input shaft 5 between the third speed gear set G3 and the output gear 20. The 3-5 synchromesh mechanism 200 includes a coupling sleeve 201 (connecting member) and a pair of clutch gears 203' and 203. The clutch gear 203' is coupled to the third speed input gear 26 and the clutch gear 203 is coupled to the output gear 20. When the coupling sleeve 201 of the 3-5 synchromesh mechanism 200 is moved leftward (toward the input side) from the neutral position shown in FIG. 1 until a spline engagement is achieved with respect to the clutch gear 203', the rotation of the third speed input gear 26 can be transferred to the first transmission input shaft 5 and the third speed can be selected. When the coupling sleeve 201 of the 3-5 synchromesh mechanism 200 is moved rightward (toward the output side) from the neutral position shown in FIG. 1 until a spline engagement is achieved with respect to the clutch gear 203, the rotation of the first transmission input shaft 5 can be transferred to the output gear 20 and the fifth speed can be selected.

A plurality of gear sets G2, G4 and G6 of the even numbered gear ranges (second speed, fourth speed, and sixth speed, respectively) is arranged between the second transmission input shaft 6 and the counter shaft 15 such that the sixth speed gear set G6 is located the closest toward the front (the input side) of the transmission, the second speed gear set G2 is located farther toward the rear (the output side), and the fourth speed gear G4 set is located still farther toward the rear.

The sixth speed gear set G6 includes a sixth speed input gear 30 provided on the second transmission input shaft 6 and a sixth speed output gear 31 (toothed wheel) provided on the counter shaft 15. The sixth speed input gear 30 and the sixth speed output gear 31 are arranged so as to be intermeshed with each other.

The second speed gear set G2 includes a second speed input gear 32 provided on the second transmission input shaft 6 and a second speed output gear 33 (toothed wheel) provided on the counter shaft 15. The second speed input gear 32 and the second speed output gear 33 are arranged so as to be intermeshed with each other.

The fourth speed gear set G4 includes a fourth speed input gear 34 provided on the second transmission input shaft 6 and a fourth speed output gear 35 (toothed wheel) provided on the counter shaft 15. The fourth speed input gear 34 and the fourth speed output gear 35 are arranged so as to be intermeshed with each other.

A 6-N synchromesh mechanism 300 (gear connecting mechanism) is provided on the counter shaft 15 beside the sixth speed gear set G6. The 6-N synchromesh mechanism 300 includes a coupling sleeve 301 (connecting member) and a clutch gear 303. The clutch gear 303 is coupled to the sixth speed output gear 31. When the coupling sleeve 301 of the 6-N synchromesh mechanism 300 is moved leftward (toward the input side) from the neutral position shown in FIG. 1 until a spline engagement is achieved with respect to the clutch gear 303, the rotation of the sixth speed output gear 31 can be transferred to the counter shaft 15 and the sixth speed can be selected.

A 2-4 synchromesh mechanism 400 (gear connecting mechanism) is provided on the counter shaft 15 between the second speed gear set G2 and the fourth speed gear set G4. The 2-4 synchromesh mechanism 400 includes a coupling sleeve 401 (connecting member) and a pair of clutch gears 403' and 403. The clutch gear 403' is coupled to the second speed output gear 33 and the clutch gear 403 is coupled to the fourth speed output gear 35. When the coupling sleeve 401 of the 2-4 synchromesh mechanism 400 is moved leftward (toward the input side) from the neutral position shown in FIG. 1 until a spline engagement is achieved with respect to the clutch gear 403', the rotation of the second speed output gear 33 can be transferred to the counter shaft 15 and the second speed can be selected. On the other hand, when the coupling sleeve 401 of the 2-4 synchromesh mechanism 400 is moved rightward (toward the output side) from the neutral position shown in FIG. 1 until a spline engagement is achieved with respect to the clutch gear 403, the rotation of the fourth speed output gear 35 can be transferred to the counter shaft 15 and the fourth speed can be selected.

The 1-R synchromesh mechanism 100, the 3-5 synchromesh mechanism 200, the 6-N synchromesh mechanism 300 and the 2-4 synchromesh mechanism 400 are operatively coupled to the actuator unit 45.

Next, a control system for controlling engagement/disengagement of the gear range and selection of the gear range in the twin-clutch automated manual transmission equipped with the position detecting device will now be explained in accordance with the embodiment of the present invention. As shown in FIG. 1, the control system includes to a 3-5 shift fork 41, a 1-R shift fork 42, a 6-N shift fork 43, a 2-4 shift fork 44, the actuator unit 45, the clutch hydraulic pressure module 46, and an automated manual transmission controller 47. The actuator unit 45 includes a 3-5 shift actuator 50, a 1-R shift actuator 52, a 6-N shift actuator 53 and a 2-4 shift actuator 54 that are operatively coupled respectively to the 3-5 shift fork 41, the 1-R shift fork 42, the 6-N shift fork 43 and the 2-4 shift fork 44. Moreover, the actuator unit 45 further includes a 3-5 shift position sensor 55, a 1-R shift position sensor 56, a 6-N shift position sensor 57 and a 2-4 shift position sensor 58. The shift position sensors 55 to 58 preferably correspond to the detecting section of the present invention. The actuator unit 45 also includes an actuator hydraulic pressure module 59.

The 3-5 shift fork 41 engages with the coupling sleeve 201 of the 3-5 synchromesh mechanism 200. Moreover, the 3-5 shift fork 41 is fixedly coupled to a first shift rod 48. The first shift rod 48 is supported by the frontward end wall 1a and the intermediate wall 1b of the transmission case 1 in such a manner that the first shift rod 48 can move in the axial direction. A 3-5 shift bracket 49 is fixed to the first shift rod 48 and an end part of the 3-5 shift bracket 49 is movably supported on a spool coupling shaft of the 3-5 shift actuator 50. Thus, the 3-5 shift fork 41 is moved to the left (when third speed is selected) or right (when fifth speed is selected) from the neutral position shown in FIG. 1 in accordance with the spool operation of the 3-5 shift actuator 50.

The 1-R shift fork 42 engages with the coupling sleeve 101 of the 1-R synchromesh mechanism 100. The 1-R shift fork 42 is arranged on a second shift rod 51 in such a manner that the 1-R shift fork 42 can be moved along the axial direction with respect to the second shift rod 51. The second shift rod 51 is supported by the frontward end wall 1a and the intermediate wall 1b of the transmission case 1 in such a manner that the second shift rod 51 cannot move (is fixed) in the axial direction. The 1-R shift fork 42 has a bracket cylinder part 42a and a bracket arm part 42b that are formed as an integral unit. An end part of the bracket arm part 42b is movably supported on a spool coupling shaft of the 1-R shift actuator 52. Thus, the 1-R shift fork 42 is moved to the left (when first speed is selected) or right (when reverse is selected) from the neutral position shown in FIG. 1 in accordance with the spool operation of the 1-R shift actuator 52.

The 6-N shift fork 43 engages with the coupling sleeve 301 of the 6-N synchromesh mechanism 300. The 6-N shift fork 43 is arranged on the second shift rod 51 in such a manner that the 6-N shift fork 43 can be moved along the axial direction with respect to the second shift rod 51, which is fixed with respect to the transmission case 1. The 6-N shift fork 43 has a bracket cylinder part 43a and a bracket arm part 43b that are formed as an integral unit. An end part of the bracket arm part 43b is movably supported on a spool coupling shaft of the 6-N shift actuator 53. Thus, the 6-N shift fork 43 is moved to the left (when sixth speed is selected) from the neutral position shown in FIG. 1 in accordance with the spool operation of the 6-N shift actuator 53.

The 2-4 shift fork 44 engages with the coupling sleeve 401 of the 2-4 synchromesh mechanism 400. The 2-4 shift fork 44 is arranged on the second shift rod 51 in such a manner that the 2-4 shift fork 44 can be moved along the axial direction with respect to the second shift rod 51, which is fixed with respect to the transmission case 1. The 2-4 shift fork 44 has a bracket cylinder part 44a and a bracket arm part 44b that are formed as an integral unit. An end part of the bracket arm part 44b is movably supported on a spool coupling shaft of the 2-4 shift actuator 54. Thus, the 2-4 shift fork 44 is moved to the left (when second speed is selected) or right (when fourth speed is selected) from the neutral position shown in FIG. 1 in accordance with the spool operation of the 2-4 shift actuator 54.

The actuator unit 45 is fixedly coupled to the transmission case 1 at a prescribed position or positions (e.g., the lower, upper, lateral, or other positions in the transmission case 1). The actuator unit 45 is arranged as an integral unit including the 3-5 shift actuator 50, the 1-R shift actuator 52, the 6-N shift actuator 53, the 2-4 shift actuator 54, the 3-5 shift position sensor 55, the 1-R shift position sensor 56, the 6-N shift position sensor 57, the 2-4 shift position sensor 58, and the actuator hydraulic pressure module 59.

The actuator hydraulic pressure module 59 is configured and arranged to produce the even numbered gear pressure Pe and the odd numbered gear pressure Po based on the line pressure PL adjusted by the clutch hydraulic pressure module 46. The actuator hydraulic pressure module 59 is also configured and arranged to supply an actuator operating pressure to the respective gear change hydraulic oil passages leading to the shift actuators 50, 52, 53, and 54 in accordance with the selected gear (speed).

The clutch hydraulic pressure module 46 is configured and arranged to adjust the line pressure PL based on the oil discharged from the oil pump 4. The clutch hydraulic pressure module 46 is further configured and arranged to produce the clutch control pressure of the first clutch CA based on the even numbered gear pressure Pe from the actuator hydraulic pressure module 59 and to produce the clutch control pressure of the second clutch CB based on the odd numbered gear pressure Po.

The controller 47 is operatively coupled to a vehicle speed sensor 60, an accelerator pedal position sensor 61, a range position sensor 62, and other sensors and switches 63 to receive information as shown in FIG. 1. The controller 47 is configured to send gear selection control commands to the valve solenoids of the actuator hydraulic pressure module 59. The controller 47 is also configured to issue clutch connection control commands (including line pressure control commands) to the valve solenoids of the clutch hydraulic pressure module 46. The controller 47 preferably corresponds to the control section and the setting section of the present invention.

Moreover, the controller 47 preferably includes a microcomputer with a position learning control program that controls the twin-clutch automated manual transmission as discussed below. The controller 47 can also include other conventional components such as an input interface circuit, an output interface circuit, and storage devices such as a ROM (Read Only Memory) device and a RAM (Random Access Memory) device. The microcomputer of the controller 47 is programmed to control the actuator unit 45 and the clutch hydraulic pressure module 46. The memory circuit stores processing results and control programs such as ones for position detecting operation that are run by the processor circuit. The controller 47 is operatively coupled to the actuator unit 45 and the clutch hydraulic pressure module 46 in a conventional manner. The internal RAM of the controller 47 stores statuses of operational flags and various control data. The internal ROM of the controller 47 stores the prescribed data and programs for various operations. The controller 47 is capable of selectively controlling any of the components of the control system in accordance with the control program. It will be apparent to those skilled in the art from this disclosure that the precise structure and algorithms for the controller 47 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Structures of Synchromesh Mechanisms

Figure 3:
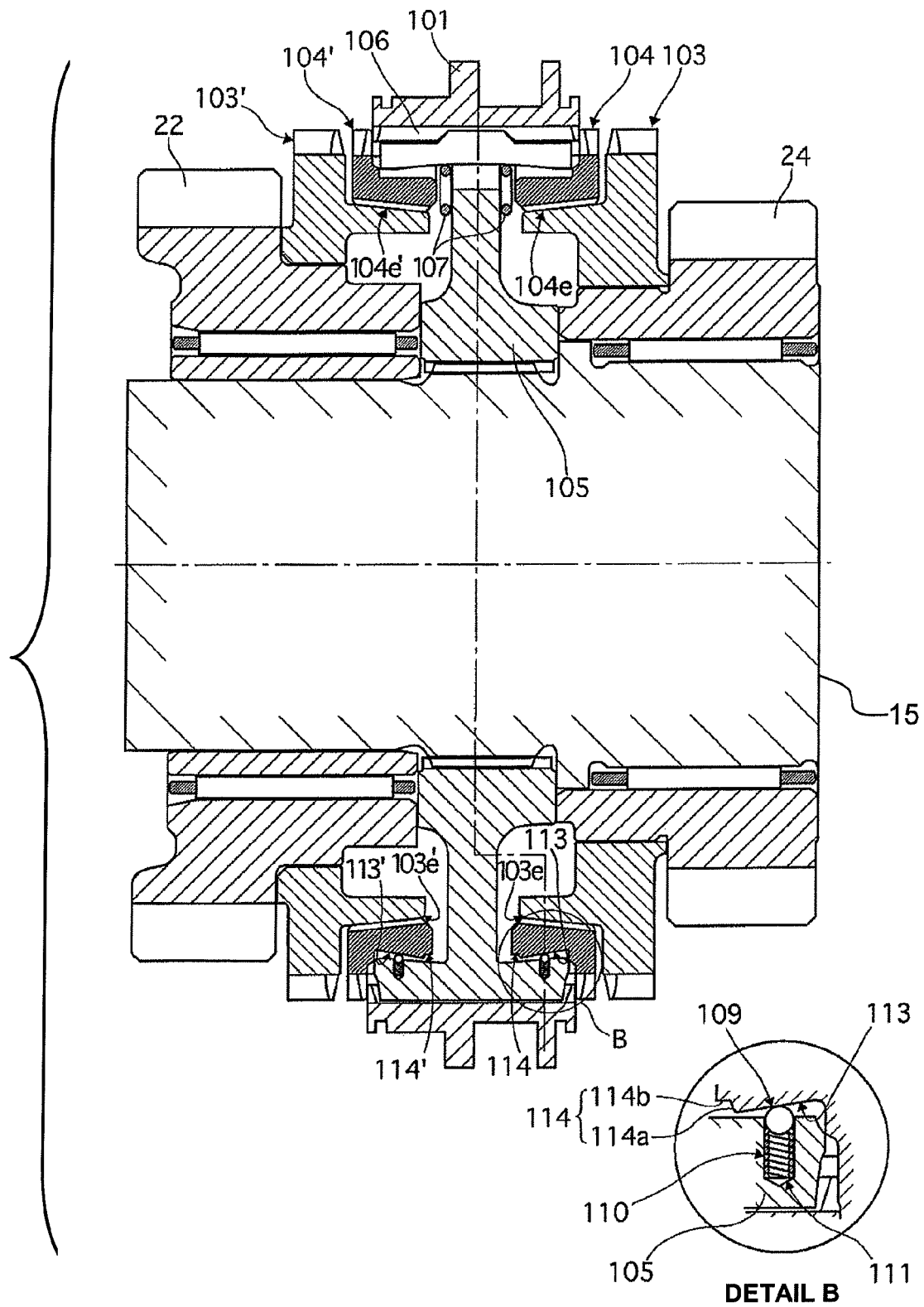
FIG. 3 is a cross-sectional view of the 1-R synchromesh mechanism of the transmission as taken along a section line 3-3 in FIG. 2 in accordance with the illustrated embodiment of the present invention.

Referring now to FIGS. 2 and 3, the structures of the 1-R synchromesh mechanism 100, the 3-5 synchromesh mechanism 200, the 6-N synchromesh mechanism 300 and the 2-4 synchromesh mechanism 400 will be explained in more detail. Since all of the 1-R synchromesh mechanism 100, the 3-5 synchromesh mechanism 200, the 6-N synchromesh mechanism 300 and the 2-4 synchromesh mechanism 400 have substantially identical configurations, only the structures of the 1-R synchromesh mechanism 100 will be described in detail herein for the sake of brevity. FIG. 2 is a side elevational view of the 1-R synchromesh mechanism 100 as viewed in an axial direction of the counter shaft 15. FIG. 3 is a cross-sectional view of the 1-R synchromesh mechanism 100 as taken along a section line 3-3 in FIG. 2.

As best shown in FIG. 3, the 1-R synchromesh mechanism 100 includes the coupling sleeve 101, the clutch gears 103 and 103', a pair of balk rings 104 and 104', a synchro hub 105, an insert key 106, a pair of spread springs 107, a plurality of balls 109, a plurality of springs 110, a plurality of setting holes 111, a pair of tapered surfaces 113 and 113', and a pair of ball-assembly guides 114 and 114'. The clutch gears 103 and 103' are coupled to the reverse output gear 24 and the first speed output gear 22, respectively.

The first speed output gear 22 and the reverse output gear 24 are both rotatably coupled to the counter shaft 15 in positions spaced apart in the axial direction of the counter shaft 15. The clutch gears 103 and 103' are formed integrally with the reverse output gear 24 and the first speed output gear 22, respectively, by press-fitting or the like. The clutch gears 103 and 103' are positioned to oppose one another in the axial direction of the counter shaft 15 with respect to the coupling sleeve 101. The clutch gear 103 includes a tapered conical surface 103e and the clutch gear 103' includes a tapered conical surface 103e'. The conical surfaces 103e and 103e' are arranged as mirror images of each other, and are positioned to oppose one another in the axial direction with respect to the synchro hub 15. Each of the clutch gears 103 and 103' includes a chamfer surface formed on an outer circumferential surface thereof that is configured and arranged to engage with the spline teeth of the coupling sleeve 101.

In the illustrated embodiment of the present invention, the coupling sleeve 101 corresponds to the connecting member configured and arranged to input the loads for the gear connecting operations. As shown in FIG. 3, the coupling sleeve 101 is positioned between the first speed output gear 22 and the reverse output gear 24. The coupling sleeve 101 is configured and arranged to form a spline engagement with the synchro hub 105 so that the coupling sleeve 101 rotates integrally with the synchro hub 105. Moreover, the coupling sleeve 101 is configured and arranged to move in the axial direction of the counter shaft 15. The coupling sleeve 101 includes a plurality of spline teeth and keyways formed on the inner sleeve surface thereof for supporting the insert key 106. The coupling sleeve 101 further includes a fork groove (groove part) formed on the outer sleeve surface for fitting the 1-R shift fork 42 (FIG. 1).

The balk rings 104 and 104' are synchronizing members configured and arranged to synchronize the rotation of the reverse output gear 24 and the first speed output gear 22, respectively, with the rotation of the synchro hub 105. The balk rings 104 and 104' are configured and arranged to move in the axial direction with respect to the counter shaft 15. Moreover, the balk rings 104 and 104' are configured and arranged to rotate by a prescribed amount corresponding to a latitude for chamfer-alignment of the spline teeth of the coupling sleeve 101 (referred as "indexing amount") with respect to the synchro hub 105. The balk ring 104 includes a tapered conical surface 104e formed on an inner ring surface thereof, and the balk ring 104' includes a tapered conical surface 104e' formed on an inner ring surface thereof. The tapered surfaces 104e and 104e' form tapered engagements with the tapered conical surfaces 103e and 103e' of the clutch gears 103 and 103', respectively. Each of the balk rings 104 and 104' further includes a chamfer surface formed on an outer ring surface thereof, which is configured and arranged to engage with the spline teeth of the coupling sleeve 101.

The synchro hub 105 is sandwiched between the balk rings 104 and 104'. The synchro hub 105 is a synchronizing member that is fixedly coupled via splines to the counter shaft 15. More specifically, the synchro hub 105 includes a plurality of spline teeth formed on the inner hub surface thereof, with these spline teeth engaging the spline teeth of the counter shaft 15. Moreover, the synchro hub 105 further includes a plurality of spline teeth formed on the outer hub surface thereof, with these spline teeth engaging the spline teeth of the coupling sleeve 101.

The insert key 106 is a synchronizing member that is positioned in the keyways formed in three locations on the outer circumference of the synchro hub 105. The insert key 106 is supported by the synchro hub 105, the coupling sleeve 101, and the spread springs 107. The insert key 106 includes a plurality of key protrusions provided on the outer circumference thereof so that the insert key 106 is held in place in a state in which the key protrusions of the insert key 106 is interlocked with the keyways of the coupling sleeve 101. The insert key 106 is configured and arranged to rotate integrally with the synchro hub 105 and to interlock with the coupling sleeve 101 to move in the axial direction of the counter shaft 15.

Gear-In Learning Operation

In the illustrated embodiment of the present invention, the position detecting device is configured and arranged to repeatedly control the 1-R synchromesh mechanism 100 to perform a gear connecting operation (i.e., gear-in operation) for a plurality of times in one of the corresponding gear ranges (i.e., the first speed range or the reverse range) with a gear releasing operation being executed between the consecutive gear-in operations. Then, a shift position (e.g., the position of the coupling sleeve 101, the 1-R shift fork 42, and/or the 1-R shift actuator 52) is detected for each gear-in operation. When the gear-in operation is repeatedly performed for a plurality of times, the position detecting device of the illustrated embodiment is preferably configured and arranged to change relative positions (phase) of the coupling sleeve 101 and the clutch gears 103 and 103' (i.e., the reverse output gear 24 and the first speed output gear 22) in the circumferential direction each time the gear-in operation is performed. The position detecting controls executed for the 3-5 synchromesh mechanism 200, the 6-N synchromesh mechanism 300 and the 2-4 synchromesh mechanism 400 (described in more detail with reference to FIGS. 4 to 6) are similar to the position detecting control executed for the 1-R synchromesh mechanism 100. Thus, only the position detecting control executed for the 1-R synchromesh mechanism will be explained in detail below.

The gear-in operation (gear connecting operation) includes, e.g., causing the coupling sleeve 101 to move from the neutral position (the position in which a pressing force is not acting on the coupling sleeve 101 and the coupling sleeve 101 is not engaged with the balk ring 104 or 104' and the clutch gear 103 or 103') via the 1-R shift fork 42 and causing the spline teeth of the coupling sleeve 101 to engage with the chamfer surface formed on the outer circumferential surface of the clutch gear 103 or 103'. The movement of the coupling sleeve 101 is carried out by the spool operation of the 1-R shift actuator 52 via the 1-R shift fork 42.

The gear releasing operation includes the movements of the gear-in operation in reverse. More specifically, the gear releasing operation includes causing the coupling sleeve 101 to move from a state in which the spline teeth of the coupling sleeve 101 are engaged with the chamfer surface formed on the outer circumferential surface of the clutch gear 103 or 103' to the neutral position in which the coupling sleeve 101 is not engaged with the balk ring 104 or 104' and the clutch gear 103 or 103'.

Since the relative positions of the clutch gear 103 and 103' and the coupling sleeve 101 are changed in the circumferential direction each time the gear-in operation is performed, and since the gear-in operation is repeatedly performed, gear-in (connecting the selected gear range) will be properly performed at least once during the plurality of gear-in operations. Therefore, when the shift position is farthest toward the clutch gear 103 or 103' after the gear-in operation (i.e., when a travel distance of the coupling sleeve 101 in the axial direction of the counter shaft 15 is at the maximum), the position detecting device is preferably configured and arranged to determine that connecting of the selected gear range has been completed.

Thus, the position detecting device is configured to learn the maximum value of the gear-in position (i.e., shift position having the maximum travel distance) during the plurality of gear-in operations, and to store the maximum value as the shift completion position. Accordingly, the position detecting device is configured and arranged to accurately detect that the connection of the selected gear range is completed and to accurately determine the completion of shift selection (completion of gear range connection). These controls are executed in the automated manual transmission controller 47 (FIG. 1).

More specifically, the controller 47 is configured to perform the gear-in operations using a pressing force that facilitates reliable gear connection. The controller 47 is configured to hold the pressing force at a constant value after a gear-in operation to reduce backlash. The controller 47 is then configured to detect the gear-in position (shift position or amount of travel) after sensor noise has been removed.

The lower limit of the pressing force during the detection of the gear-in position is set as a value at which the pressing force overcomes the gear thrusting force, and the upper limit of the pressing force is set as a value at which sensor error due to warping of parts can be ignored (or, alternatively, a value in a range in which sensor error can be compensated for).

For example, when the first speed input gear 21 and the first speed output gear 22 are formed as helical gears, the gear thrusting force will act in the axial direction when drive force is transmitted from the first speed input gear 21 to the first speed output gear 22. The first speed input gear 21 and the first speed output gear 22 are constantly engaged in the illustrated embodiment, and thus, the rotation of the drive input shaft 2 due to the drag torque of the first clutch CA is transmitted to the first speed output gear 22. Accordingly, the gear thrusting force acts on the first speed output gear 22. When the gear thrusting force acts on the first speed output gear 22 in the direction of (toward) the coupling sleeve 101, the first speed output gear 22 will be repositioned toward the coupling sleeve 101 in accordance with the amount of backlash in the axial direction. If the coupling sleeve 101 is pressed toward the clutch gear 103' in this state in order to perform the gear-in operation, the axial position of the clutch gear 103' will vary depending on changes in the pressing force. In other words, the clutch gear 103' is pressed toward the coupling sleeve 101 by the gear thrusting force of the first speed output gear 22 when the pressing force is less than the gear thrusting force. On the other hand, the clutch gear 103' is pressed toward the fourth-speed output gear 35 when the pressing force is greater than the gear thrusting force.

Accordingly, the position of the clutch gear 103 or 103' changes depending on the pressing force. Therefore, the gear-in operation in the illustrated embodiment is performed with the pressing force higher than the gear thrusting force. Thus, the shift completion position (having the maximum travel distance of the coupling sleeve 101) at which the gear-in operation is considered to be completed can be set without influences of backlash due to the gear thrusting force.

The holding time of the coupling sleeve in the gear-in position is set in advance as a period of time in which sensor noise can be removed and the gear-in position can be recognized.

In the illustrated embodiment, the clutch hydraulic pressure module 46 is configured and arranged to supply oil to the first and second clutches CA and CB to cool the first and second clutches CA and CB. Therefore, the drag torque of the first and second clutches CA and CB are generated by supplying this cooling oil to the first and second clutches CA and CB. More specifically, the drag torque is produced by the viscosity of the oil that cools the first and second clutches CA and CB. In the illustrated embodiment of the present invention, the first and second transmission input shafts 5 and 6 are rotated by the drag torque of the first and second clutches CA and CB to change the relative positions (phase) of the clutch gear (103 and 103', 203 and 203', 303, or 403 and 403') and the corresponding coupling sleeve (101, 201, 301 or 401) in the circumferential direction. When the twin-clutch automated manual transmission has large amount of friction, the clutch hydraulic pressure module 46 is controlled to increase the amount of oil flow, and thus, to increase the drag torque of the first and second clutches CA and CB so that the relative positions (phase) of the clutch gear and the corresponding coupling sleeve in the circumferential direction change. In such arrangement, torque can be transmitted by the first and second clutches CA and CB using the drag torque even when the first and second clutches CA and CB are not in the physically engaged states (e.g., the clutch plates are not physically contacting each other). Of course, it will be apparent to those skilled in the art from this disclosure that the first and second transmission input shafts 5 and 6 are not limited to be rotated by the drag torque to change the phase between the clutch gear and the coupling sleeve. For example, the first and second transmission input shafts 5 and 6 can also be rotated by directly connecting the first and second clutches CA and CB instead of using the drag torque.

Gear-In Learning Control Process

Figure 4:
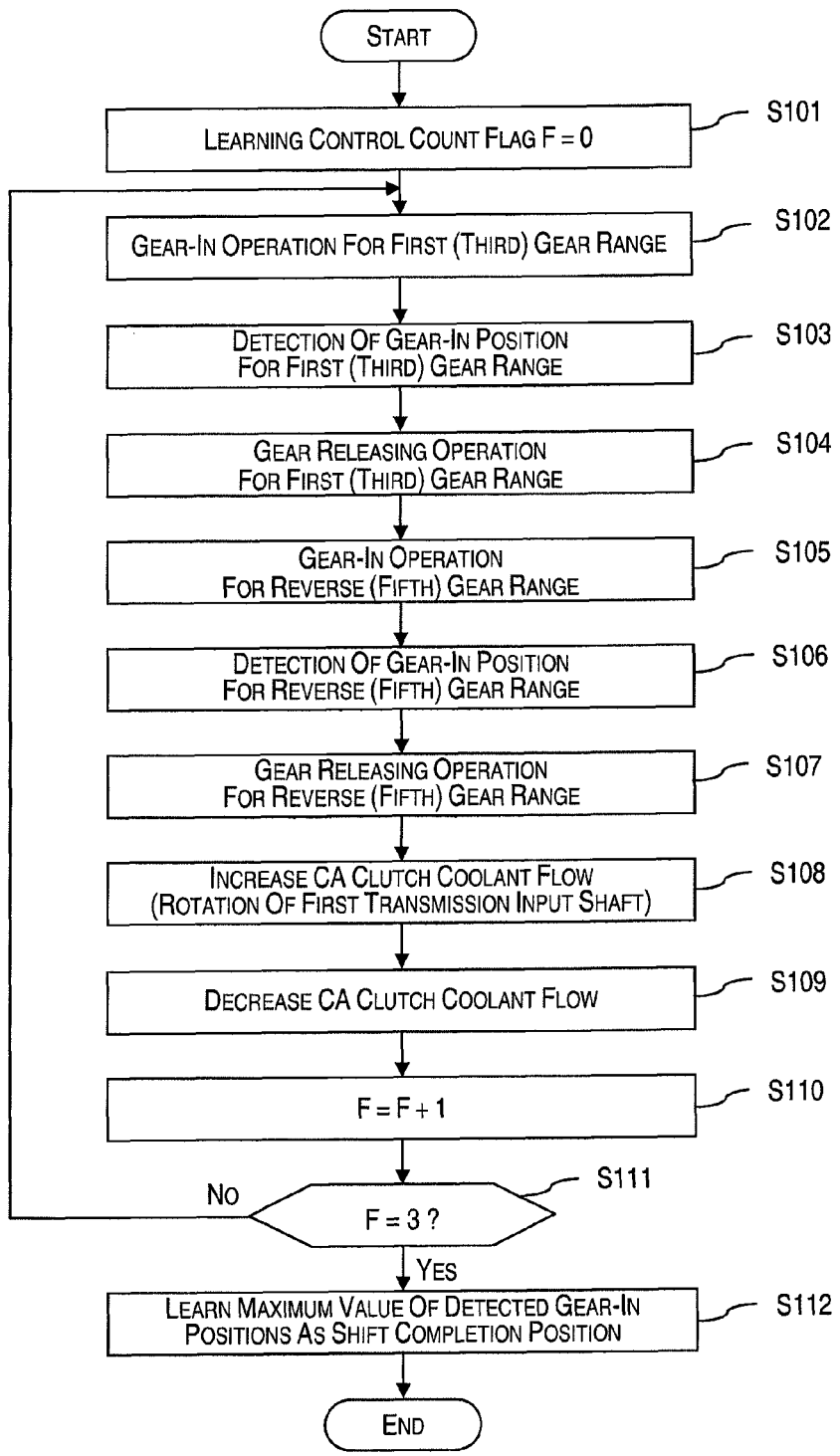
FIG. 4 is a flowchart for explaining a control flow of a learning control process for the 1-R synchromesh mechanism of the transmission in accordance with the illustrated embodiment of the present invention.

Referring now to a flowchart of FIG. 4, a learning control process executed by the controller 47 for the 1-R synchromesh mechanism 100 (and the 3-5 synchromesh mechanism 200) will be explained. FIG. 4 is the flowchart illustrating a control flow of the learning control process for the 1-R synchromesh mechanism 100. The control flow of the learning control process for the 3-5 synchromesh mechanism 200 is identical to the control flow illustrated in FIG. 4 except that the first gear range is changed to the third gear range, and the reverse range is changed to the fifth gear range in the 3-5 synchromesh mechanism 200. Thus, the explanation of the control flow of the learning control process for the 3-5 synchromesh mechanism 200 is omitted.

In step S101 of FIG. 4, the controller 47 is configured to set a value of a learning control count flag F to 0. Then, the controller 47 proceeds to step S102.

In step S102, the controller 47 is configured to perform a gear-in operation for the first gear range (or the third gear range). Then, the controller 47 proceeds to step S103.

In step S103, the controller 47 is configured to detect the gear-in position (shift position) for the first gear range (or the third gear range) based on, for example, the output signal from the 1-R shift position sensor 56 (or the 3-5 shift position sensor 55). Then, the controller 47 proceeds to step S104.

In step S104, the controller 47 is configured to perform a gear releasing operation for the first gear range (or the third gear range). Then, the controller 47 proceeds to step S105.

In step S105, the controller 47 is configured to perform a gear-in operation for the reverse gear range (or the fifth gear range). Then, the controller 47 proceeds to step S106.

In step S106, the controller 47 is configured to detect the gear-in position (shift position) for the reverse gear range (or the fifth gear range) based on, for example the output signal from the 1-R shift position sensor 56 (or the 3-5 shift position sensor 55). Then, the controller 47 proceeds to step S107.

In step S107, the controller 47 is configured to perform a gear releasing operation for the reverse gear range (or the fifth gear range). Then, the controller 47 proceeds to step S108.

In step S108, the controller 47 is configured to control the clutch hydraulic pressure module 46 to increase the flow of coolant (oil) to the first clutch CA so that the drag torque is generated in the first clutch CA to rotate the first transmission input shaft 5. Thus, in step S108, the relative positions (phase) of the clutch gears 103 and 103' and the coupling sleeve 101 in the circumferential direction are changed. Then, the controller 47 proceeds to step S109. Thus, the control executed in step S108 corresponds to the changing mechanism of the present invention.

In step S109, the controller 47 is configured to control the clutch hydraulic pressure module 46 to reduce (correct) the flow of coolant (oil) to the first clutch CA to eliminate the drag torque in the first clutch CA, which was generated in step S108. Then, the controller 47 proceeds to step S110.

In step S110, the controller 47 is configured to increment the value of the learning control count flag F by one. Then, the controller 47 proceeds to step S111.

In step S111, the controller 47 is configured to determine whether the value of the learning control count flag F is equal to 3. If the value of the learning control count flag F is equal to 3 (YES in step S111), then the controller 47 proceeds to step S112. If the value of the learning control count flag F is not equal to 3 (NO in step S111), then the controller 47 proceeds to step S102 to repeat the processing from step S102 to S110. Thus, the gear-in operation for each of the first gear range (or the third gear range) and the reverse gear range (or the fifth gear range) is repeatedly performed (e.g., 3 times in this illustrated embodiment).

In step S112, the controller 47 is configured to learn the maximum value of the gear-in position among the gear-in positions detected in step S103 as the shift completion position for the first gear range (or the third gear range). Likewise, the controller 47 is configured to learn the maximum value of the gear-in position among the gear in positions detected in step S106 as the shift completion position for the reverse gear range (or the fifth gear range). Then, the controller 47 ends the control process illustrated in FIG. 4.

Referring now to a flowchart of FIG. 5, a learning control process executed by the controller 47 for the 2-4 synchromesh mechanism 400 will be explained.

Figure 5:
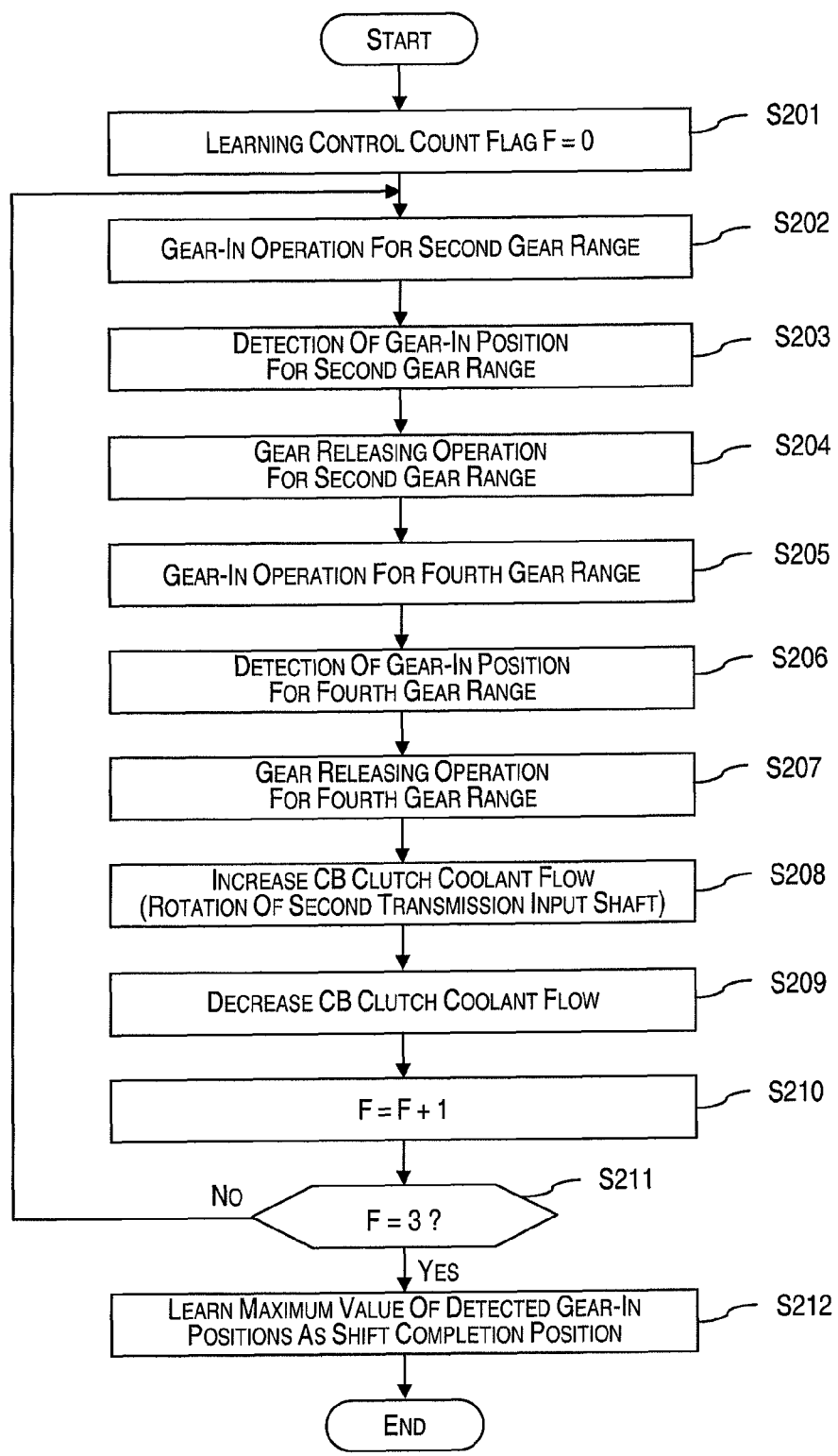
FIG. 5 is a flowchart for explaining a control flow of a learning control process for a 2-4 synchromesh mechanism of the transmission in accordance with the illustrated embodiment of the present invention.

In step S201 of FIG. 5, the controller 47 is configured to set a value of a learning control count flag F to 0. Then, the controller 47 proceeds to step S202.

In step S202, the controller 47 is configured to perform a gear-in operation for the second gear range. Then, the controller 47 proceeds to step S203.

In step S203, the controller 47 is configured to detect the gear-in position (shift position) for the second gear range based on, for example, the output signal from the 2-4 shift position sensor 58. Then, the controller 47 proceeds to step S204.

In step S204, the controller 47 is configured to perform a gear releasing operation for the second gear range. Then, the controller 47 proceeds to step S205.

In step S205, the controller 47 is configured to perform a gear-in operation for the fourth gear range. Then, the controller 47 proceeds to step S206.

In step S206, the controller 47 is configured to detect the gear-in position (shift position) for the fourth gear range based on, for example, the output signal from the 2-4 shift position sensor 58. Then, the controller 47 proceeds to step S207.

In step S207, the controller 47 is configured to perform a gear releasing operation for the fourth gear range. Then, the controller 47 proceeds to step S208.

In step S208, the controller 47 is configured to control the clutch hydraulic pressure module 46 to increase the flow of coolant (oil) to the second clutch CB so that the drag torque is generated in the second clutch CB to rotate the second transmission input shaft 6. Thus, in step S208, the relative positions (phase) of the clutch gears 403 and 403' and the coupling sleeve 401 in the circumferential direction are changed. Then, the controller 47 proceeds to step S209.

In step S209, the controller 47 is configured to control the clutch hydraulic pressure module 46 to reduce (correct) the flow of coolant (oil) to the second clutch CB to eliminate the drag torque in the second clutch CB, which was generated in step S108. Then, the controller 47 proceeds to step S210.

In step S210, the controller 47 is configured to increment the value of the learning control count flag F by one. Then, the controller 47 proceeds to step S211.

In step S211, the controller 47 is configured to determine whether the value of the learning control count flag F is equal to 3. If the value of the learning control count flag F is equal to 3 (YES in step S211), then the controller 47 proceeds to step S212. If the value of the learning control count flag F is not equal to 3 (NO in step S211), then the controller 47 proceeds to step S202 to repeat the processing from step S202 to S210. Thus, the gear-in operation for each of the second gear range and the fourth gear range is repeatedly performed (e.g., 3 times in this illustrated embodiment).

In step S212, the controller 47 is configured to learn the maximum value of the gear-in position among the gear-in positions detected in step S203 as the shift completion position for the second gear range. Likewise, the controller 47 is configured to learn the maximum value of the gear-in position among the gear in positions detected in step S206 as the shift completion position for the fourth gear range. Then, the controller 47 ends the control process illustrated in FIG. 5.

Referring now to a flowchart of FIG. 6, a learning control process executed by the controller 47 for the 6-N synchromesh mechanism 300 will be explained.

Figure 6:
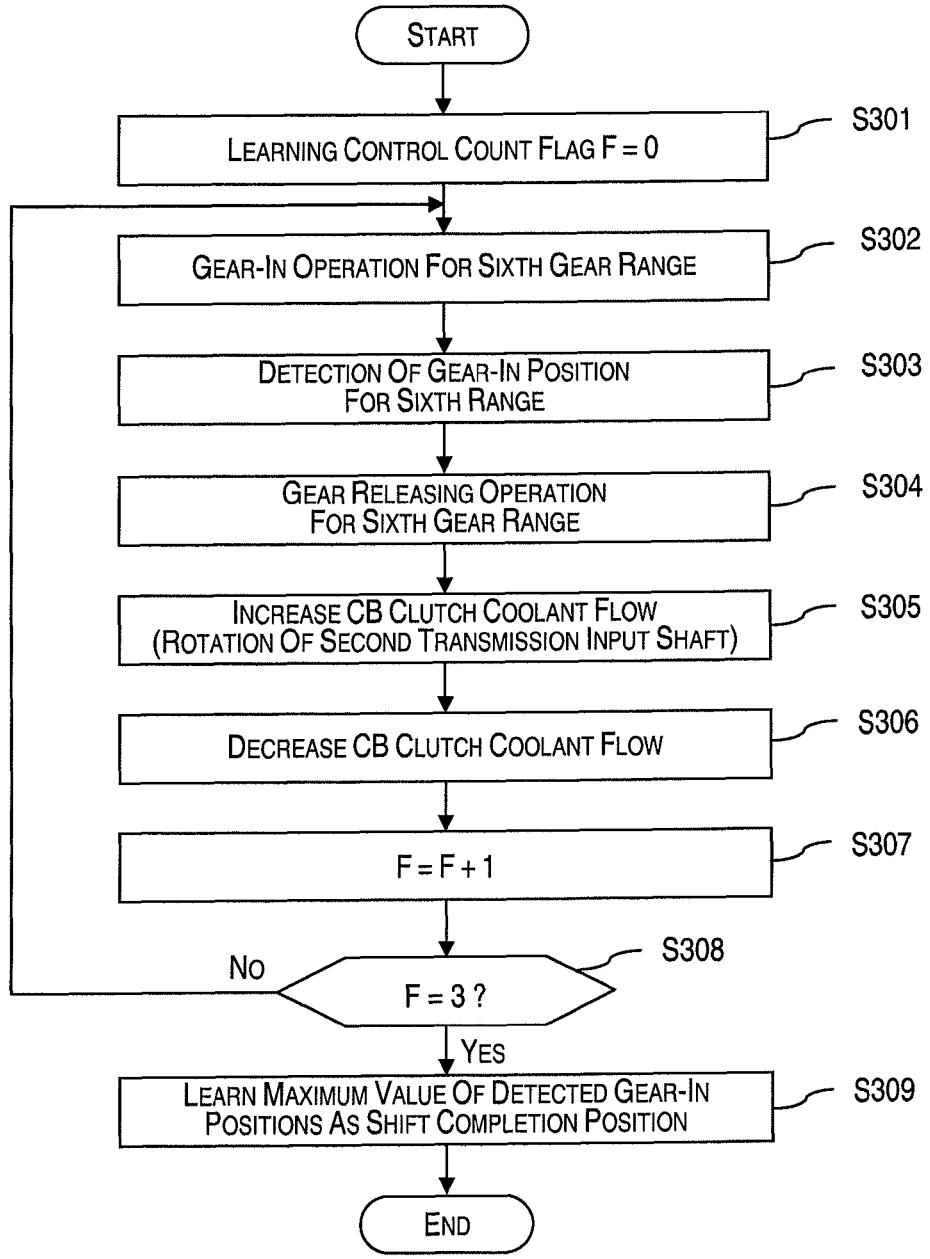
FIG. 6 is a flowchart for explaining a control flow of a learning control process for a 6-N synchromesh mechanism of the transmission in accordance with the illustrated embodiment of the present invention.

In step S301 of FIG. 6, the controller 47 is configured to set a value of a learning control count flag F to 0. Then, the controller 47 proceeds to step S302.

In step S302, the controller 47 is configured to perform a gear-in operation for the sixth gear range. Then, the controller 47 proceeds to step S303.

In step S303, the controller 47 is configured to detect the gear-in position (shift position) for the sixth gear range based on, for example, the output signal from the 6-N shift position sensor 57. Then, the controller 47 proceeds to step S304.

In step S304, the controller 47 is configured to perform a gear releasing operation for the sixth gear range. Then, the controller 47 proceeds to step S305.

In step S305, the controller 47 is configured to control the clutch hydraulic pressure module 46 to increase the flow of coolant (oil) to the second clutch CB so that the drag torque is generated in the second clutch CB to rotate the second transmission input shaft 6. Thus, in step S305, the relative positions (phase) of the clutch gear 303 and the coupling sleeve 301 in the circumferential direction are changed. Then, the controller 47 proceeds to step S306.

In step S306, the controller 47 is configured to control the clutch hydraulic pressure module 46 to reduce (correct) the flow of coolant (oil) to the second clutch CB to eliminate the drag torque in the second clutch CB, which was generated in step S305. Then, the controller 47 proceeds to step S307.

In step S307, the controller 47 is configured to increment the value of the learning control count flag F by one. Then, the controller 47 proceeds to step S308.

In step S308, the controller 47 is configured to determine whether the value of the learning control count flag F is equal to 3. If the value of the learning control count flag F is equal to 3 (YES in step S308), then the controller 47 proceeds to step S309. If the value of the learning control count flag F is not equal to 3 (NO in step S308), then the controller 47 proceeds to step S302 to repeat the processing from step S302 to S307. Thus, the gear-in operation for the sixth gear range is repeatedly performed (e.g., 3 times in this illustrated embodiment).

In step S309, the controller 47 is configured to learn the maximum value of the gear-in position among the gear-in positions detected in step S303 as the shift completion position for the sixth gear range. Then, the controller 47 ends the control process illustrated in FIG. 6.

Change Over Time During Gearing Learning Control

Figure 7:
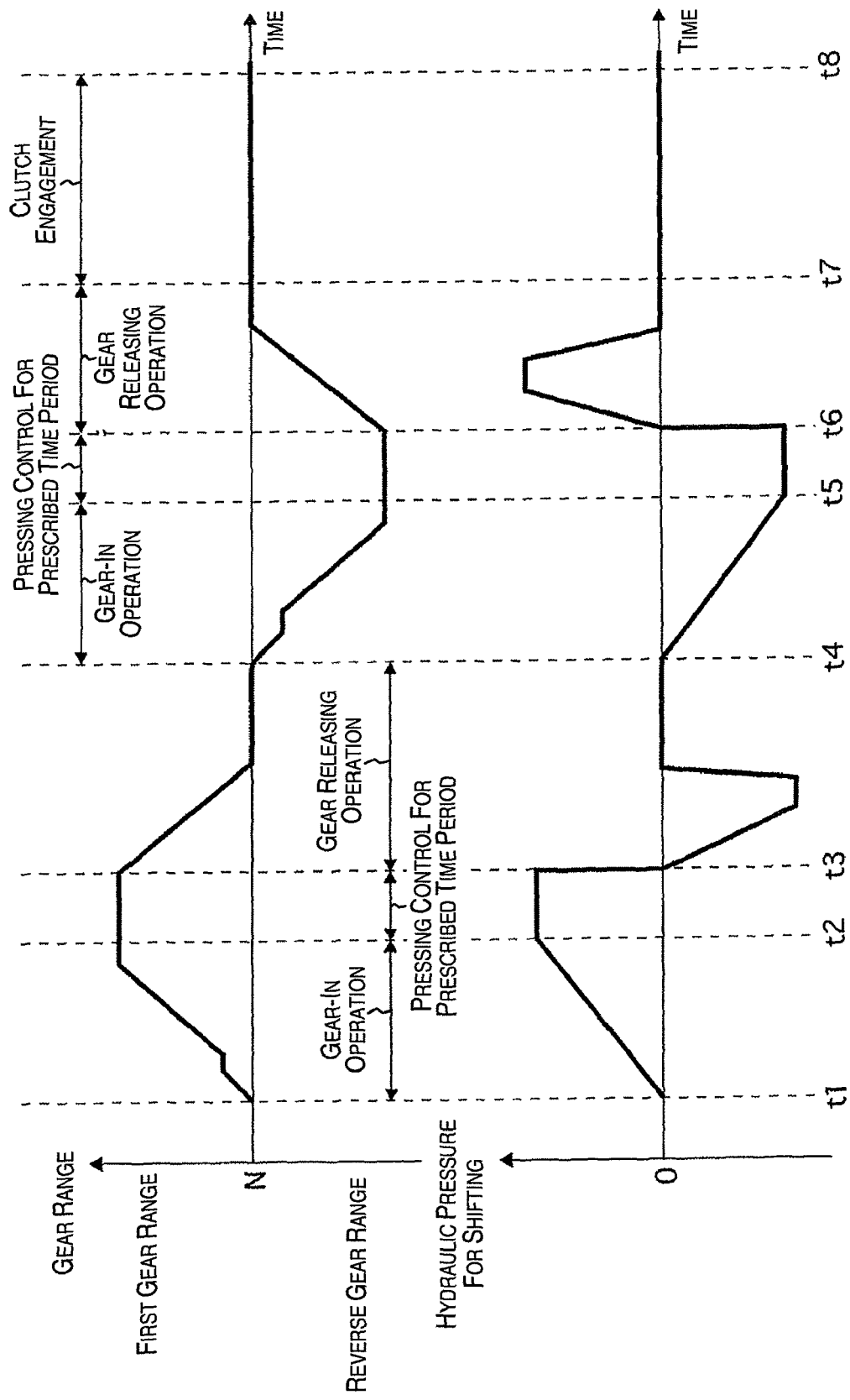
FIG. 7 is a time chart illustrating changes in a gear range and a hydraulic pressure for shifting over time during the learning control process for the 1-R synchromesh mechanism in accordance with the illustrated embodiment of the present invention.

FIG. 7 is a time chart illustrating changes in the shift position (gear range) and the shift hydraulic pressure over time during the gearing learning control for the 1-R synchromesh mechanism 100. The time charts for the 3-5 synchromesh mechanism 200, the 6-N synchromesh mechanism 300 and the 2-4 synchromesh mechanism 400 are similar to the one shown in FIG. 7, and thus, the explanations thereof are omitted herein for the sake of brevity.

As shown in FIG. 7, at time t1, the controller 47 is configured to control the actuator hydraulic pressure module 59 to increase the hydraulic pressure for shifting to the first gear range. Thus, the gear-in operation for the first gear range is initiated at time t1 (step S102 in FIG. 4).

At time t2, the controller 47 is configured to control the actuator hydraulic pressure module 59 to stop increasing the hydraulic pressure for shifting to the first gear range. Thus, the gear-in operation for the first gear range is completed at time t2. Moreover, the controller 47 is configured to maintain the hydraulic pressure for a prescribed period of time (between time t2 and time t3) so that a pressing control is executed for a prescribed period of time. Then, the controller 47 is configured to detect the shift position (gear-in position) for the first gear range (step S103).

At time t3, the controller 47 is configured to control the actuator hydraulic pressure module 59 to reduce the hydraulic pressure for shifting to the first gear range. Thus, the gear releasing operation for the first gear range is initiated at time t3 (step S104).

At time t4, the controller 47 is configured to control the actuator hydraulic pressure module 59 to increase the hydraulic pressure for shifting to the reverse gear range. Thus, the gear releasing operation for the first gear range is completed and the gear-in operation for the reverse gear range is initiated at time t4 (step S105).

At time t5, the controller 47 is configured to control the actuator hydraulic pressure module 59 to stop increasing the hydraulic pressure for shifting to the reverse gear range. Thus, the gear-in operation for the reverse gear range is completed at time t5. Moreover, the controller 47 is configured to maintain the hydraulic pressure for a prescribed period of time (between time t5 and time t6) so that a pressing control is executed for a prescribed period of time. Then, the controller 47 is configured to detect the shift position (gear-in position) for the reverse gear range (step S106).

At time t6, the controller 47 is configured to control the actuator hydraulic pressure module 59 to reduce the hydraulic pressure for shifting to the reverse gear range. Thus, the gear releasing operation for the first gear range is initiated at time t6 (step S107).

At time t7, the gear releasing operation for the reverse gear range is completed. Then, the controller 47 is configured to control the clutch hydraulic pressure module 46 to increase the coolant (oil) flow to the first clutch CA, thereby producing the drag torque to effectively engage the first clutch CA (step S108).

This control executed between time t1 and time t8 in FIG. 7 is repeated for a plurality of times (e.g., three times). Then, controller 47 is configured to learn the maximum values of the gear-in positions among the gear-in positions detected as the shift completion positions for the first gear range and the reverse gear range, respectively (step S112).

According to the position detecting device of the illustrated embodiment of the present invention, the gear-in operation is repeatedly performed for the selected gear range. Therefore, even if the movement of the connecting member (the coupling sleeve 101, 201, 301 or 401) is hampered by, for example, interference due to the relative locations of the connecting member and the peripheral structural members of the transmission such that one of the gear-in operations has not been completed, there is a possibility that interference can be avoided and the connecting member can be fully moved in the other gear-in operations. Thus, the position detecting device can avoid erroneous determination of the shift completion position at which the gear connecting operation is determined to be completed by detecting the position of the connecting member after each of the gear connecting operations and by eliminating the position of the connecting member at which the connecting member was not able to fully move based on the detected positions.

Thus, with the position detecting device according to the illustrated embodiment of the present invention, a situation in which the connecting (gear-in) of the gear range has completely completed for each gear range can be reliably detected, and erroneous setting of the shift completion position can be avoided.

Moreover, in the illustrated embodiment of the present invention, the synchromesh mechanisms 100 to 400 include the coupling sleeves 101 to 401, respectively. The automated manual transmission controller 47 is configured to control the clutch hydraulic pressure module 46 to change the relative positions (phase) in the circumferential direction of the coupling sleeves 101 to 401 and the corresponding clutch gears of each of the gear ranges every time the gear-in operation is performed. Therefore, the gear-in operation will be properly performed (e.g., shift is completed) at least once during the plurality of the gear-in operations, and a reliable determination that the gear-in has been completed can be made when the gear-in position (shift position or travel amount) reaches the maximum value. The shift completion position can therefore be reliably set by determining the gear-in position having the maximum value among the plurality of gear-in positions detected.

Moreover, in the illustrated embodiment, the controller 47 is configured to control the clutch hydraulic pressure module 46 to increase the drag torque in the first and second clutches CA and CB so that torque is transmitted by the first clutch CA and by the second clutch CB, respectively. Therefore, the relative positions of the coupling sleeves 101 to 401 and the corresponding clutch gears of each of the gear ranges can be relatively easily changed by controlling the drag torque in the first and second clutches CA and CB.

Furthermore, since the torque is transmitted by the first and second clutches CA and CB by generating the drag torque, the relative positions of the coupling sleeves 101 to 401 and the corresponding clutch gears of each of the gear ranges can be changed without the first and second clutches CA and CB being completely (physically) engaged.

Also, the controller 47 is configured to change the relative positions of the coupling sleeves 101 to 401 and the corresponding clutch gears of each of the gear ranges when the gears are released (after the gear releasing operation and before the subsequent gear connecting operation). The torque is transmitted via the insert key (e.g., the insert key 106) of the synchromesh mechanism when the gear range is in a connected state. In such state, the coupling sleeves 101 to 401 cannot rotate with respect to the corresponding clutch gears. Thus, when the first and second clutches CA and CB are connected in this state, engine torque is transmitted to the transmission output shaft 11, and the vehicle starts or stalls. Therefore, in the illustrated embodiment, the drag torque is generated in the first and second clutches CA and CB when the coupling sleeves 101 to 401 and the corresponding clutch gears are completely released. Accordingly, unexpected starting and stalling of the vehicle can be avoided.

Although the position detecting device of the present invention was described based on the illustrated embodiment, the present invention is not limited to the specific configurations of the illustrated embodiment.

For example, although the shift position sensors 55 to 58 were described as the detecting section configured and arranged to detect the position of the coupling sleeves 101 to 401 in the illustrated embodiment, the present invention is not limited to such arrangement. More specifically, the position detecting device may also be configured and arranged as, for example, a controller unit such as the controller 47 that includes the control section, the detecting section, and the setting section. In such case, the position detection signals from the shift position sensors 55 to 58 are sent to the controller 47, and the detecting section within the controller 47 is configured and arranged to detect the position or travel amount of the coupling sleeves 101 to 401. Of course, it will be apparent to those skilled in the art from this disclosure that one or a plurality of controller units can be used to carry out the present invention.

Also, although the maximum value of the shift position among the plurality of gear-in positions was set as the shift completion position in the illustrated embodiment, the present invention is not limited to such arrangement. For example, the position detecting device of the present invention can be configured and arranged to detect an amount of change in the shift position, and to set the maximum value of the amount of change as the shift completion position. Alternatively, the position detecting device of the present invention can be configured and arranged to set an average value of the shift positions of the plurality of the gear-in positions as the shift completion position. When the average value of the shift positions is set as the shift completion position, it is determined that the connecting of the gear is completed when the shift position (e.g., detected by determining the travel distance of the coupling sleeve, the shift fork and/or the shift actuator) exceeds the shift completion position or a value corresponding to the shift completion position. In such case too, situations in which the gear releases because the coupling sleeve is inadequately connected to the corresponding clutch gear can be avoided.

Although, in the illustrated embodiment of the present invention, the position detecting device is configured and arranged to detect the position of the connecting member after each of the gear connecting operations (i.e., every time the gear connecting operation has been performed), the present invention is not limited to such arrangement. More specifically, the position detecting device of the present invention does not necessarily have to detect the position of the connecting member after each time the gear connecting operation has been performed as long as a plurality of (at least two) positions of the connecting member after the gear connecting operations are detected. In other words, the position detecting device of the present invention can be configured and arranged to detect the position of the connecting member for a prescribed number of times (e.g., twice) after the gear connecting operations while the gear connecting operations are performed more than the prescribed number of times (e.g., four times).

The position detecting device according to the present invention can be adapted to a transmission control apparatus for a vehicle transmission that has a pair of parallel shafts. Also, the position detecting device according to the present invention can be adapted to a transmission control apparatus for an automated manual transmission, as in the illustrated embodiment, as well as to a conventional manual transmission.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A position detecting device comprising:
 a control section configured to repeatedly control a gear connecting mechanism in a vehicle transmission to selectively perform a gear connecting operation to obtain a selected gear range and a gear releasing operation to release the selected gear range after the gear connecting operation has been performed, the control section being further configured to perform the gear connecting operation by moving a shift fork of the gear connecting mechanism with a pressing force, an upper limit of which is set at a value at which sensor error due to warping of the shift fork will be ignored;
 a detecting section configured and arranged to detect a position of a connecting member of the gear connecting mechanism after the gear connecting operation has been performed; and
 a setting section configured to set a shift completion position at which connecting of the selected gear range is determined to be completed based on a plurality of positions of the connecting member of the gear connecting mechanism detected by the detecting section.

2. The position detecting device according to claim 1, wherein
 the setting section is further configured to set one of the positions of the connecting member of the gear connecting mechanism detected by the detecting section that is farthest from a neutral position at which the selected gear range is released as the shift completion position.

3. A vehicle transmission comprising:
 a plurality of gear sets configured and arranged to transmit a drive force generated by a drive source with a plurality of gear ranges, respectively;
 a gear connecting mechanism having a connecting member configured and arranged to selectively obtain a selected gear range by connecting corresponding one of the gear sets; and
 a position detecting device including
  a control section configured to repeatedly control the gear connecting mechanism to selectively perform a gear connecting operation to obtain the selected gear range and a gear releasing operation to release the selected gear range after the gear connecting operation has been performed, the control section being further configured to perform the gear connecting operation by moving a shift fork of the gear connecting mechanism with a pressing force, an upper limit of which is set at a value at which sensor error due to warping of the shift fork will be ignored,
  a detecting section configured and arranged to detect a position of the connecting member of the gear connecting mechanism after the gear connecting operation has been performed, and
  a setting section configured to set a shift completion position at which connecting of the corresponding one of the gear sets is determined to be completed based on a plurality of positions of the connecting member of the gear connecting mechanism detected by the detecting section.

4. The vehicle transmission according to claim 3, wherein
 each of the gear sets includes at least one toothed wheel coupled to a rotational shaft such that the toothed wheel rotates with respect to the rotational shaft,
 the connecting member of the gear connecting mechanism includes a coupling sleeve coupled to the rotational shaft such that the coupling sleeve rotates together with the rotational shaft, the coupling sleeve being configured and arranged to move along an axial direction of the rotational shaft, and
 the control section of the position detecting device is configured to perform the gear connecting operation by moving the coupling sleeve in the axial direction of the rotational shaft to engage with the toothed wheel.

5. The vehicle transmission according to claim 4, wherein
 the gear connecting mechanism further includes
  the shift fork engaged with a groove part formed on an outer circumferential surface of the coupling sleeve, and
  an actuator configured and arranged to operate the shift fork to move in the axial direction of the rotational shaft to move the coupling sleeve in the axial direction of the rotational shaft, and
 the detecting section of the position detecting device is configured and arranged to detect the position of the coupling sleeve of the gear connecting mechanism based on a position of the actuator.

6. The vehicle transmission according to claim 4, further comprising
 a changing mechanism configured and arranged to change relative positions of the coupling sleeve and the toothed wheel in a circumferential direction of the coupling sleeve after the gear releasing operation and before subsequent one of the gear connecting operations.

7. The vehicle transmission according to claim 4, further comprising
 a clutch disposed in a transmission pathway configured and arranged to transmit the drive force generated by the drive source to at least one of the coupling sleeve and the toothed wheel,
 the position detecting device further including a clutch control section configured to control the clutch to rotate at least one of the coupling sleeve and the toothed wheel after the gear releasing operation,
 the control section of the position detecting device being further configured to perform the gear connecting operation after the at least one of the coupling sleeve and the toothed wheel was rotated by the clutch control section.

8. The transmission according to claim 7, further comprising
 a pump configured and arranged to supply a fluid into a clutch case for housing a clutch plate of the clutch,
 the clutch control section of the position detecting device being further configured to supply the fluid from the pump into the clutch case so that torque is transmitted by the clutch to rotate the at least one of the coupling sleeve and the toothed wheel.

9. The transmission according to claim 8, wherein
 the clutch control section of the position detecting device is further configured to supply a coolant as the fluid into the clutch case to produce a drag torque in the clutch.

10. A position detecting device comprising:
 controlling means for repeatedly and selectively performing a gear connecting operation to obtain a selected gear range and a gear releasing operation to release the selected gear range after the gear connecting operation has been performed by applying a shift fork pressing force with an upper limit value corresponding to at which sensor error due to shift fork warping will be ignored;
 detecting means for detecting a connecting member position after the gear connecting operation has been performed; and
 setting means for setting a shift completion position at which connecting of the selected gear range is determined to be completed based on a plurality of connecting member positions detected by the detecting means.

11. A position detecting method comprising:
 repeatedly controlling a gear connecting mechanism to selectively perform a gear connecting operation to obtain a selected gear range and a gear releasing operation to release the selected gear range after the gear connecting operation has been performed by moving a shift fork of the gear connecting mechanism with a pressing force, an upper limit of which is set at a value at which sensor error due to warping of the shift fork will be ignored;
 detecting a position of a connecting member of the gear connecting mechanism after the gear connecting operation has been performed; and
 setting a shift completion position at which connecting of the selected gear range is determined to be completed based on a plurality of positions of the connecting member of the gear connecting mechanism detected.

* * * * *